United States Patent
Fujiwara et al.

(10) Patent No.: US 8,893,579 B2
(45) Date of Patent: Nov. 25, 2014

(54) OPERATING PEDAL DEVICE FOR VEHICLE

(75) Inventors: Noboru Fujiwara, Toyota (JP); Takumi Uno, Toyota (JP)

(73) Assignee: Toyoda Iron Works Co., Ltd., Toyota-shi, Aichi-ken (JP)

( * ) Notice: Subject to any disclaimer, the term of this patent is extended or adjusted under 35 U.S.C. 154(b) by 186 days.

(21) Appl. No.: 13/067,315

(22) Filed: May 24, 2011

(65) Prior Publication Data
US 2011/0290066 A1    Dec. 1, 2011

(30) Foreign Application Priority Data

May 25, 2010    (JP) ................................ 2010-119935

(51) Int. Cl.
| | | |
|---|---|---|
| *G05G 1/38* | (2008.04) | |
| *G05G 1/44* | (2008.04) | |
| *B60T 11/18* | (2006.01) | |
| *B60T 7/04* | (2006.01) | |
| *B60T 8/32* | (2006.01) | |
| *G05G 1/46* | (2008.04) | |
| *G01L 1/22* | (2006.01) | |
| *G01L 5/22* | (2006.01) | |

(52) U.S. Cl.
CPC ................ *B60T 7/042* (2013.01); *B60T 11/18* (2013.01); *B60T 8/3255* (2013.01); *G05G 1/38* (2013.01); *G05G 1/46* (2013.01); *G01L 1/2206* (2013.01); *G01L 5/225* (2013.01)
USPC ............................................. 74/512; 74/560

(58) Field of Classification Search
CPC ....... B60T 11/18; B60T 7/042; B60T 8/3255; G01L 1/2206; G01G 1/38; G01G 1/46
USPC ............... 74/512–514, 560; 73/132, 541, 862
See application file for complete search history.

(56) References Cited

U.S. PATENT DOCUMENTS 3,988,945 A * 11/1976 Fasano ............................. 74/512
4,297,550 A * 10/1981 Leighton .................... 200/61.89
(Continued)

FOREIGN PATENT DOCUMENTS

| DE | 42 08 496 | 8/1993 |
| EP | 1 898 191 | 3/2008 |

(Continued)

OTHER PUBLICATIONS

Extended European Search Report for EP Appl. No. 11167235.8 dated May 7, 2013.

(Continued)

*Primary Examiner* — Vinh Luong
(74) *Attorney, Agent, or Firm* — Finnegan, Henderson, Farabow, Garrett & Dunner, LLP

(57) ABSTRACT

An operating pedal device for a vehicle, includes: an operating pedal disposed at a pedal support fixed to a vehicle so as to be pivotable about an axis of a support shaft, and depressed by a driver; a reaction force member connected to the operating pedal through at least one connecting portion connecting paired members in a manner such that the paired members are relatively pivotable about a connecting pin, an output in accordance with an operating force of the operating pedal being transmitted to the reaction force member, and a reaction force corresponding to the output being applied to the reaction force member; a strain detecting element disposed in an elastic portion deformed by the reaction force, the strain detecting element electrically detecting the operating force by being deformed together with the elastic portion; in one of the paired members connected by one of the at least one connecting portion, an opening provided near the connecting pin to permit the connecting pin to be relatively displaced by the reaction force; and a portion of the one of the paired members, which is elastically deformed due to displacement of the connecting pin, being used as the elastic portion.

19 Claims, 14 Drawing Sheets

(56) References Cited

U.S. PATENT DOCUMENTS

| | | | |
|---|---|---|---|
| 4,978,177 A * | 12/1990 | Ingraham et al. | 303/3 |
| 5,350,225 A | 9/1994 | Steiner et al. | |
| 5,563,355 A | 10/1996 | Pluta et al. | |
| 5,771,752 A * | 6/1998 | Cicotte | 74/512 |
| 6,155,385 A * | 12/2000 | Basnett | 188/72.7 |
| 6,763,741 B2 * | 7/2004 | Frobel et al. | 74/512 |
| 7,082,853 B2 * | 8/2006 | Fujiwara | 74/512 |
| 7,748,289 B2 * | 7/2010 | Collins | 74/512 |
| 8,479,608 B2 * | 7/2013 | Schonlau et al. | 74/512 |
| 8,763,477 B2 * | 7/2014 | Isono | 73/862.636 |
| 2003/0106392 A1 * | 6/2003 | Willemsen | 74/512 |
| 2003/0200863 A1 * | 10/2003 | Dreischarf et al. | 92/140 |
| 2008/0060452 A1 | 3/2008 | Fujiwara et al. | |
| 2008/0223171 A1 * | 9/2008 | Fujiwara et al. | 74/512 |
| 2008/0250894 A1 * | 10/2008 | Fujiwara | 74/514 |
| 2008/0307920 A1 * | 12/2008 | Fujiwara | 74/512 |
| 2009/0049932 A1 | 2/2009 | Isono et al. | |
| 2009/0229402 A1 * | 9/2009 | Khan et al. | 74/512 |
| 2014/0150599 A1 * | 6/2014 | Fujiwara | 74/512 |

FOREIGN PATENT DOCUMENTS

| | | | |
|---|---|---|---|
| EP | 1 970 790 | 9/2008 | |
| EP | 1 980 459 | 10/2008 | |
| JP | 2008-120348 | 5/2008 | |
| JP | 2008-232625 | 10/2008 | |
| JP | 2008-304990 | 12/2008 | |
| WO | WO 2010/109639 | 9/2010 | |
| WO | WO 2010/109639 A1 * | 9/2010 | G05G 1/38 |

OTHER PUBLICATIONS

Office Action for Chinese Appl. No. 201110187572.1, dated Dec. 4, 2013.

* cited by examiner

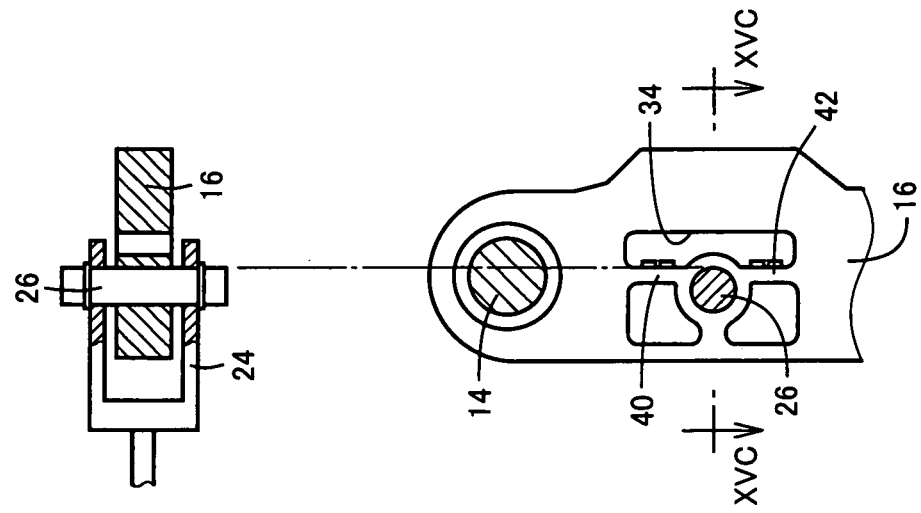
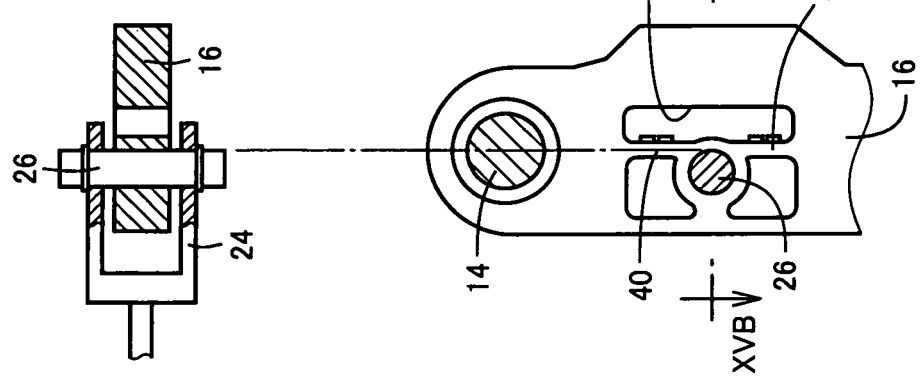
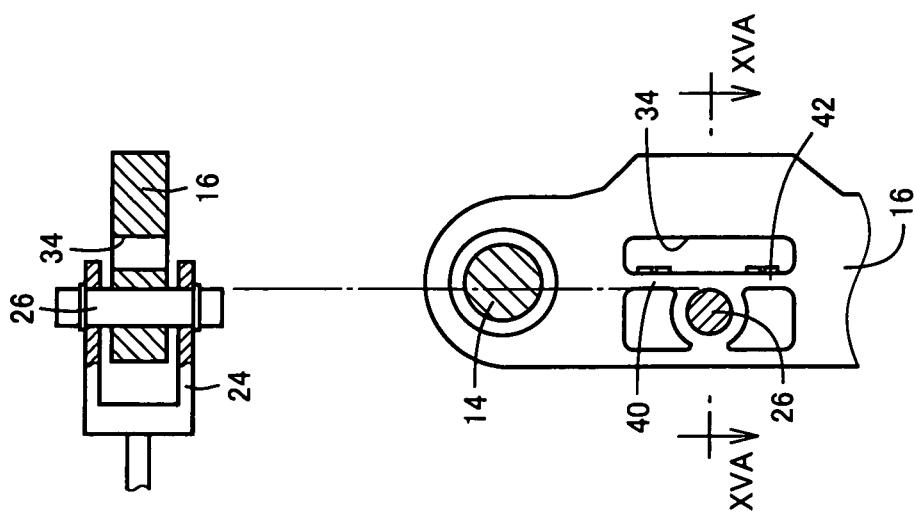

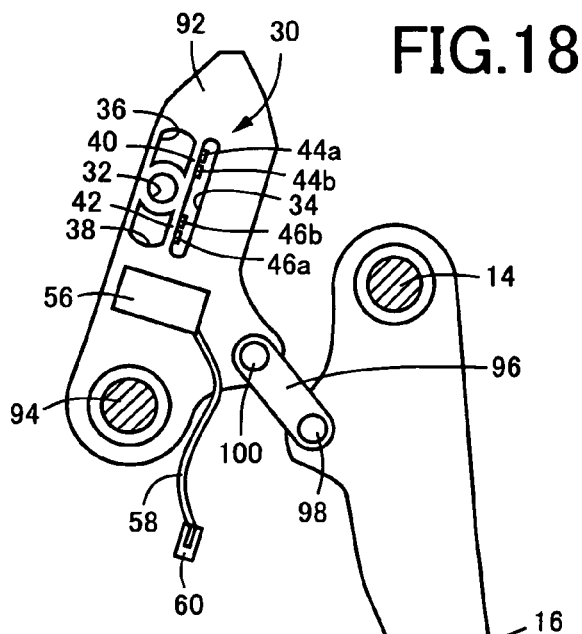
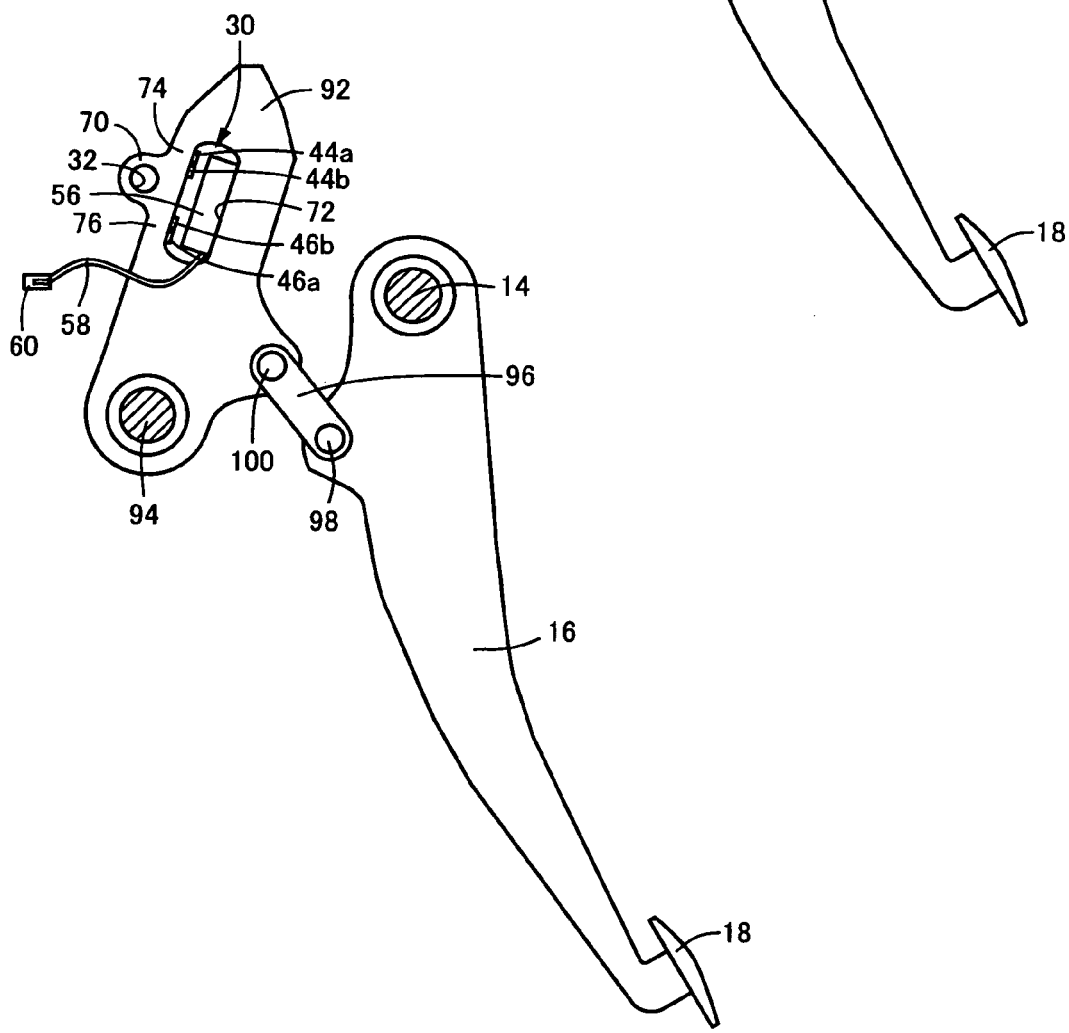

FIG.21A
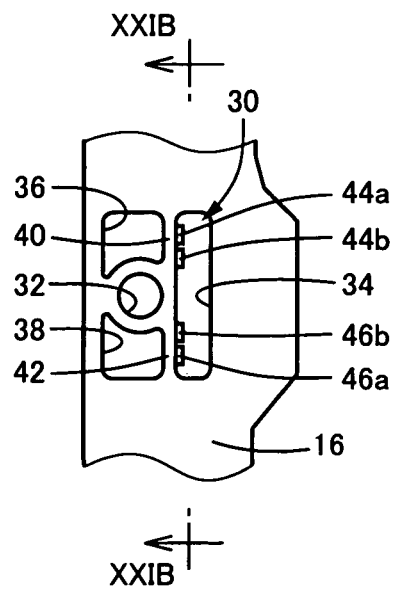
FIG.21B
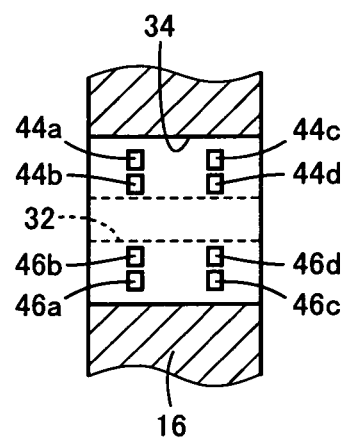
FIG.21C
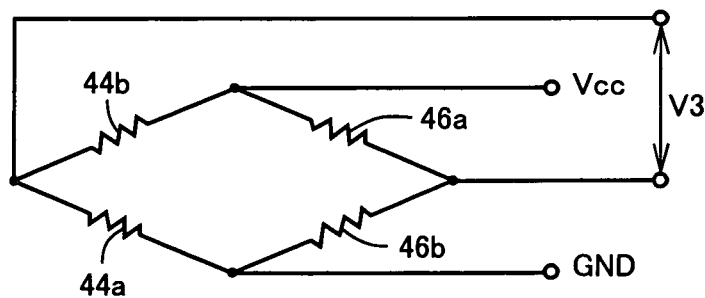
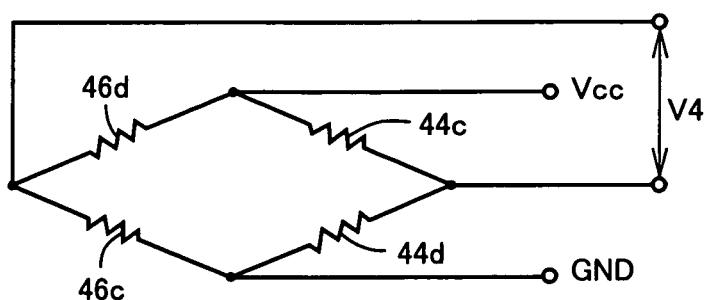

OPERATING PEDAL DEVICE FOR VEHICLE

INCORPORATION BY REFERENCE

The disclosure of Japanese Patent Application No. 2010-119935 filed on May 25, 2010 including the specification, drawings and abstract is incorporated herein by reference in its entirety.

BACKGROUND OF THE INVENTION

1. Field of the Invention

The invention relates to an operating pedal device for a vehicle, and particularly to improvement of an operating pedal device for a vehicle, in which an operating force is electrically detected.

2. Description of Related Art

An operating pedal device for a vehicle, comprising: (a) an operating pedal disposed at a pedal support fixed to a vehicle so as to be pivotable about an axis of a support shaft, and depressed by a driver; (b) a reaction force member connected to the operating pedal through at least one connecting portion connecting paired members in a manner such that the paired members are relatively pivotable about a connecting pin, an output in accordance with an operating force of the operating pedal being transmitted to the reaction force member, and a reaction force corresponding to the output being applied to the reaction force member; and (c) a strain detecting element disposed in an elastic portion deformed by the reaction force, the strain detecting element electrically detecting the operating force by being deformed together with the elastic portion, for example, a brake pedal device and an accelerator pedal device are known. Japanese Patent Application Publication No. 2008-120348 (JP-A-2008-120348) describes a device that is an example of the operating pedal device for a vehicle. In the device described in the publication No. 2008-120348, a sensor attachment hole is provided in a connecting portion in which a connecting pin is used, and a load sensor is disposed in the sensor attachment hole. The load sensor includes a cylindrical elastic body deformed by a reaction force.

However, the load sensor is composed of many components, has a complicated structure, and is expensive. As a result, there is a problem that the manufacturing cost of the operating pedal device for a vehicle is increased.

SUMMARY OF THE INVENTION

The invention is made in light of the above-described circumstances. It is an object of the invention to make it possible to easily configure an operating pedal device for a vehicle, in which an operating force is electrically detected, at low cost, using a small number of components.

Means for Solving the Problems

To achieve the above object, the first aspect of the present invention provides an operating pedal device for a vehicle, comprising: (a) an operating pedal disposed at a pedal support fixed to a vehicle so as to be pivotable about an axis of a support shaft, and depressed by a driver; (b) a reaction force member connected to the operating pedal through at least one connecting portion connecting paired members in a manner such that the paired members are relatively pivotable about a connecting pin, an output in accordance with an operating force of the operating pedal being transmitted to the reaction force member, and a reaction force corresponding to the output being applied to the reaction force member; (c) a strain detecting element disposed in an elastic portion deformed by the reaction force, the strain detecting element electrically detecting the operating force by being deformed together with the elastic portion; (d) in one of the paired members connected by one of the at least one connecting portion, an opening provided near the connecting pin to permit the connecting pin to be relatively displaced by the reaction force; and a portion of the one of the paired members, which is elastically deformed due to displacement of the connecting pin, being used as the elastic portion.

The second aspect of the invention provides the operating pedal device for a vehicle recited in the first aspect of the invention, wherein a plurality of the elastic portions are located in a plurality of locations positioned on both sides of a plane extending through the connecting pin and extending in a displacement direction of the connecting pin, in an entire range of a stroke of a depressing operation, regardless of a change in the displacement direction of the connecting pin due to the depressing operation performed on the operating pedal.

The third aspect of the invention provides the operating pedal device for a vehicle recited in the first or second aspect of the invention, wherein a small-width portion is provided in the opening; and a width of the opening at the small-width portion is reduced to 0 to prevent the connecting pin from being further displaced when a depressing force larger than a largest value in a normal use range is applied to the operating pedal. The width of the opening signifies the width of the opening in a direction in which the connecting pin is permitted to be displaced by the reaction force.

The fourth aspect of the invention provides the operating pedal device for a vehicle recited in any of the first to third aspects of the invention, wherein a circuit box, in which a detecting circuit is provided, is disposed inside the opening; and the detecting circuit connected to the strain detecting element outputs an electric signal corresponding to the operating force.

The fifth aspect of the invention provides the operating pedal device for a vehicle recited in any of the first to fourth aspects of the invention, wherein (a) in a state where a predetermined pedal-side member is inserted inside a clevis with a bifurcated shape, which is integrally fixed to the reaction force member, in the connecting portion, a clevis pin is disposed to extend through the clevis and the pedal-side member, the clevis pin connecting the clevis and the pedal-side member in a manner such that the clevis and the pedal-side member are relatively pivotable; (b) the clevis pin is the connecting pin; the reaction force member and the pedal-side member are the paired members relatively pivotably connected to each other through the connecting pin; and the opening and the elastic portion are provided in the pedal-side member.

The sixth aspect of the invention provides the operating pedal device for a vehicle recited in the fifth aspect of the invention, wherein the pedal-side member is the operating pedal.

The seventh aspect of the invention provides the operating pedal device for a vehicle recited in the fifth aspect of the invention, further comprising (a) an intermediate lever pivotably disposed at the pedal support, and connected to the operating pedal through a connecting link, wherein (b) the pedal-side member is the intermediate lever.

The eighth aspect of the invention provides the operating pedal device for a vehicle recited in any of the fifth to seventh aspects of the invention, wherein the clevis pin directly contacts the pedal-side member to deform the elastic portion.

The Effects of the Invention

In the operating pedal device for a vehicle, the paired members is relatively pivotably connected through the connecting pin. In one of the paired members, the opening is provided near the connecting pin to permit the connecting pin to be displaced by the reaction force. In a portion of the one of the paired members, the portion which is elastically deformed due to the displacement of the connecting pin, is used as the elastic portions. Therefore, as compared to the case where a load sensor, which is a separate body and includes a separate elastic body, is integrally fitted as in a conventional case, the number of components in the entire device is reduced, the structure is made simple, and the device is configured at low cost.

In the second aspect of the invention, the elastic portions are located in a plurality of locations positioned on both sides of the plane extending through the connecting pin and extending in the displacement direction of the connecting pin, in the entire range of the stroke of the depressing operation performed on the operating pedal, regardless of the change in the displacement direction of the connecting pin due to the depressing operation performed on the operating pedal. Therefore, strain signals (resistance value or the like) in the strain detecting elements provided in the elastic portions on the plurality of locations are relatively increased and decreased due to the depressing operation performed on the operating pedal. Thus, it is possible to detect the operating force with high accuracy, regardless of the change in the displacement direction.

In the third aspect of the invention, a small-width portion is provided in the opening; and a width of the opening at the small-width portion is reduced to 0 to prevent the connecting pin from being further displaced when a depressing force larger than a largest value in a normal use range is applied. Therefore, excessive deformation of the elastic portion is prevented to ensure durability, while the operating force in the normal use range is permitted to be detected based on the deformation of the elastic portion.

In the fourth aspect of the invention, a circuit box, in which a detecting circuit is provided, is disposed inside the opening; and the detecting circuit connected to the strain detecting element outputs an electric signal corresponding to the operating force. Therefore, as compared to the case where the circuit box is attached to, for example, a side surface of the operating pedal, the circuit box does not cause interference, for example, when the depressing operation is performed on the operating pedal. Thus, the fourth aspect of the invention can be applied to a conventional operating pedal device for a vehicle without greatly changing the design.

The fifth aspect of the invention relates to the case where the opening and the elastic portion are provided in the pedal-side member in the connecting portion connecting the reaction force member and the pedal-side member. The output transmitted to the reaction force member is detected as the operating force. Therefore, for example, when a hydraulic brake or the like is mechanically operated through the reaction force member, it is possible to detect the operating force such as the braking force thereof, with high accuracy. Also, in a state where the pedal-side member is inserted inside the clevis with a bifurcated shape, which is integrally fixed to the reaction force member, the clevis pin is disposed to extend through the clevis and the pedal-side member, and the clevis pin connects the clevis and the pedal-side member in a manner such that the clevis and the pedal-side member are relatively pivotable. Therefore, it is possible to suppress generation of a torsional moment in the pedal-side member in which the elastic portion is provided. Thus, it is possible to detect the operating force with high accuracy.

The sixth aspect of the invention relates to the case where the pedal-side member is the operating pedal, and the seventh aspect of the invention relates to the case where the pedal-side member is the intermediate lever. In each of the cases, it is possible to electrically detect the operating force easily, by providing the opening and the elastic portion without the need of greatly changing the design.

The eighth aspect of the invention relates to the case where the clevis pin directly contacts the pedal-side member to deform the elastic portion, and a torsional moment generated in the pedal-side member is reduced, and thus, the operating force is detected with high accuracy, as compared to the case where the clevis pin is connected through a load transmission member integrally provided to extend from the pedal-side member toward an end portion side in the axial direction of the clevis pin.

BRIEF DESCRIPTION OF THE DRAWINGS

Features, advantages, and technical and industrial significance of exemplary embodiments of the invention will be described below with reference to the accompanying drawings, in which like numerals denote like elements, and wherein:

FIGS. 15A to 15C are views showing three examples in which a load input position varies in a plate thickness direction of plate portions that function as elastic portions in the embodiment shown in FIGS. 1A and 1B;

FIG. 18 is a view in which the pedal support and the reaction force member in FIG. 17 are omitted;

FIG. 19 is a front view used to explain another example of the case where the invention is applied to the operating pedal device for a vehicle, which includes the intermediate lever, FIG. 19 being a front view corresponding to FIG. 18;

FIGS. 21A to 21C are views used to explain an embodiment in which eight strain resistance elements are provided, FIG. 21A being a front view corresponding to FIG. 3A, FIG. 21B being a sectional view taken along a line XXIB-XXIB in FIG. 21A, and FIG. 21C being a circuit diagram showing an example of the detecting circuit.

DETAILED DESCRIPTION OF EMBODIMENTS

Figure 1A:
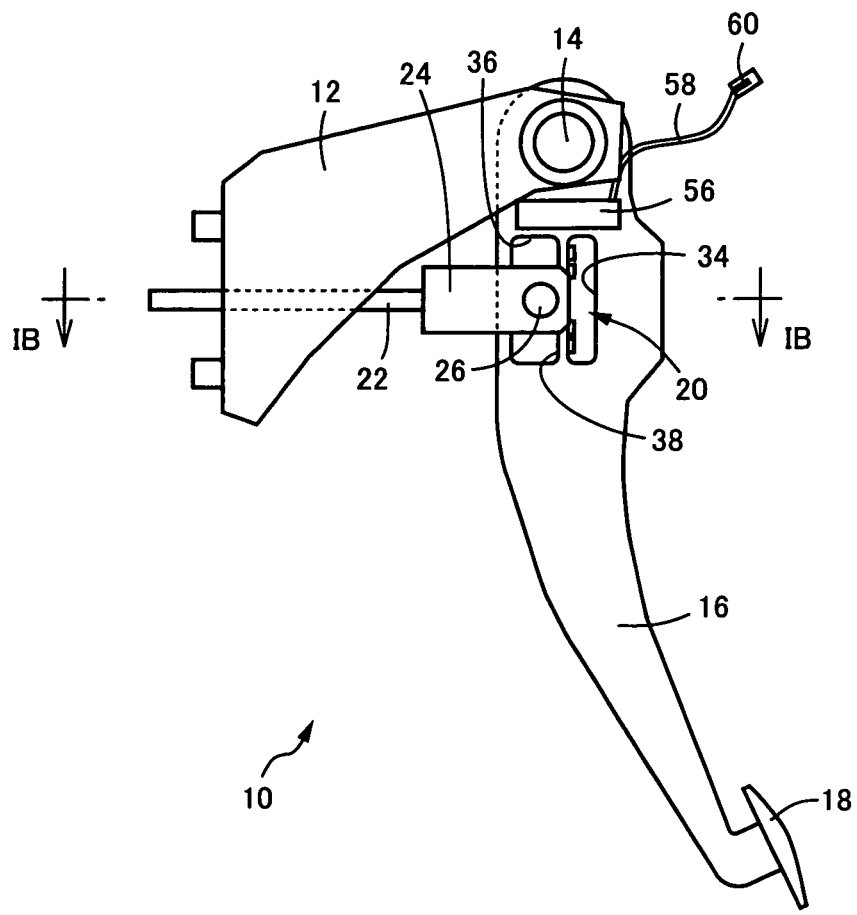
FIGS. 1A and 1B are views used to explain an example of an operating pedal device for a vehicle, which is used for a service brake, and to which the invention is applied, FIG. 1A being a front view, and FIG. 1B being an enlarged view showing a section taken along a line IB-IB in FIG. 1A.

The operating pedal device for a vehicle according to the invention is appropriately applied to a brake pedal device for a service brake. However, the operating pedal device for a vehicle according to the invention may be applied to an operating pedal device for an accelerator or a parking brake. The reaction force member is, for example, an operating rod of a brake booster, or a push rod of a brake master cylinder, and the reaction force member is configured to mechanically operate wheel brakes or the like. However, it is possible to apply the invention to an electric (by-wire type) operating pedal device that electrically controls the wheel brakes, a vehicle drive device, or the like according to the operating force that is electrically detected. In this case, a stroke simulator, a reaction force mechanism, or the like is connected to the reaction force member so that a predetermined reaction force is applied to the reaction force member.

In the connecting portion, the opening and the elastic portion are provided in one of paired members. It is appropriate that the connecting portion should be the connecting portion connecting the operating pedal and the reaction force member, or the connecting portion connecting the intermediate lever and the reaction force member, as in the sixth aspect of the invention or the seventh aspect of the invention. However, it is possible to provide the opening and the elastic portion in another connecting portion, such as a connecting portion connecting the operating pedal and a connecting link, a connecting portion connecting the intermediate lever and the connecting link, or a connecting portion in which the intermediate lever is pivotably supported by a pedal support. In the fifth aspect of the invention, the opening and the elastic portion are provided in the pedal-side member. However, it is possible to provide the opening and the elastic portion in a reaction force member-side member that includes the reaction force member.

The opening provided in one of the paired members to permit a connecting pin to be relatively displaced by the reaction force is a through-hole with a predetermined shape. The opening is provided at least on a side toward which the connecting pin is displaced, in a manner such that a predetermined thickness is left between the opening and the connecting pin. Also, one or a plurality of openings are provided so that, for example, thin plate portions are provided on both sides of the connecting pin at positions on both sides of a plane extending through the connecting pin and extending in a displacement direction of the connecting pin. The paired plate portions on both sides are elastically bent and deformed, and thus, the connecting pin is permitted to be displaced. The plate portions are curved due to the displacement of the connecting pin, and are partially subjected to compression deformation and tensile deformation. Therefore, the portions, which are subjected to compression deformation and tensile deformation, are used as elastic portions, and strain detecting elements are attached to the elastic portions. Both surfaces of the plate portions may be used as the elastic portions, and the strain detecting elements may be attached to the elastic portions.

The strain detecting element outputs an electric signal corresponding to the amount of deformation (strain) by being deformed integrally with the elastic portion elastically deformed. The operating force can be calculated based on the electric signal according to a predetermined map or a predetermined operational equation. As the strain detecting element, a strain resistance element, such as a thin film semiconductor strain gauge, a thick film semiconductor strain gauge, or an ordinary strain gauge, is preferably used. However, it is possible to use a piezo element, a piezoelectric conversion element, or the like. The operating force can be obtained by detecting strain using a single strain detecting element. However, it is preferable to form a bridge circuit using four strain detecting elements. Further, it is possible to combine two bridge circuits using eight strain detecting elements.

In the third aspect of the invention, the small-width portion is provided. When a depressing force larger than the largest value in a normal use range is applied, the width of the opening at the small-width portion is reduced to 0 to prevent the connecting pin from being further displaced. However, when implementing the other inventions, the small-width portion is not necessarily required. Also, it is possible to prevent excessive deformation of the elastic portion in various manners, for example, by restricting the connecting pin from being displaced by an amount equal to or larger than a given amount using a stopper member configured as a separate body, by restricting the range of relative pivot of the paired members in the connecting portion, or by restricting the range of depression of the operating pedal.

In the fourth aspect of the invention, the circuit box, in which the detecting circuit such as a bridge circuit is provided, is disposed inside the opening. However, it is possible to fix the circuit box to, for example, a side surface of the operating pedal. When implementing the other inventions, the circuit box is not necessarily required, and it is possible to employ various configurations, for example, a configuration in which a wire connected to the strain detecting element is connected to a control portion or the like using a wire harness or the like.

Embodiments

Figure 1B:
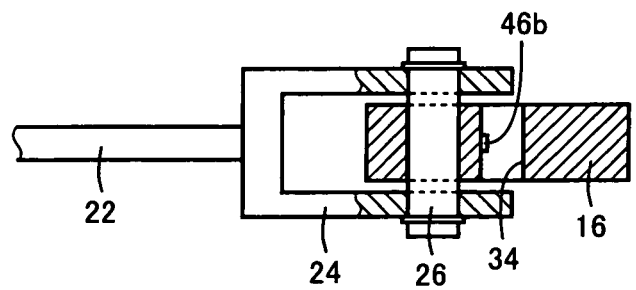

Hereinafter, embodiments of the invention will be described in detail with reference to the drawings. FIGS. 1A and 1B are views showing an operating pedal device 10 for a service brake of a vehicle according to an embodiment of the invention. FIG. 1A is a front view (i.e., a view showing the operating pedal device 10 seen from the left side of a vehicle when the operating pedal device 10 is provided in the vehicle). FIG. 1B is an enlarged view showing a section taken along a line IB-IB in FIG. 1A. An operating pedal 16 is disposed at a pedal support 12 integrally fixed to the vehicle so as to be pivotable about the axis of a support shaft 14 that is substantially horizontal. A depressing operation is performed on the operating pedal 16 by a driver according to a request for braking. A stepped portion (pad) 18 is provided at a lower end portion of the operating pedal 16. An operating rod 22 of a brake booster is connected to an intermediate portion of the operating pedal 16 through a connecting portion 20. In the case of a by-wire type operating pedal device that electrically controls wheel brakes, a reaction force member, to which a predetermined reaction force is applied by a reaction force mechanism or the like, is connected to the operating pedal 16, instead of connecting the operating rod 22 to the operating pedal 16.

The connecting portion 20 includes a clevis 24, and a clevis pin 26. The clevis 24 with a bifurcated shape (U-shape) is integrally fixed at an end portion of the operating rod 22 using a screw connection or the like. The clevis pin 26 is disposed in the operating pedal 16 to extend in parallel with the support shaft 14. The connecting portion 20 connects the operating rod 22 and the operating pedal 16 in a manner such that the operating rod 22 and the operating pedal 16 are relatively pivotable about the axis of the clevis pin 26. The operating pedal 16 is inserted inside the clevis 24. Both end portions of the clevis pin 26 protrude toward areas on both sides of the operating pedal 16. The clevis pin 26 extends through the clevis 24, and is prevented from slipping out of the clevis 24 by a snap ring or the like. The operating rod 22 corresponds to the reaction force member. An output in accordance with the operating force of the operating pedal 16 is transmitted to the operating rod 22 through the connecting portion 20, and the reaction force corresponding to the output is applied to the operating rod 22 by the brake booster. The clevis pin 26 corresponds to the connecting pin. The operating pedal 16 is one of paired members in the connecting portion 20, and corresponds to the pedal-side member.

Figure 2:
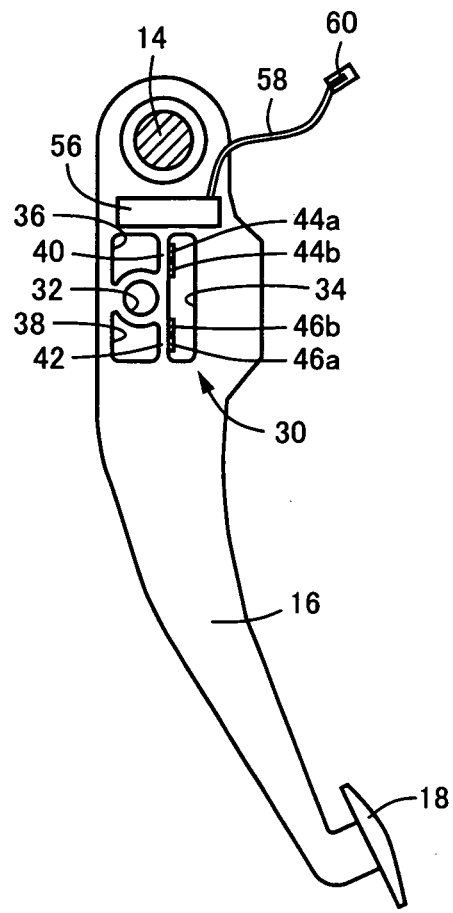
FIG. 2 is a view in which a pedal support and a reaction force member in FIG. 1A are omitted.
Figure 3A:
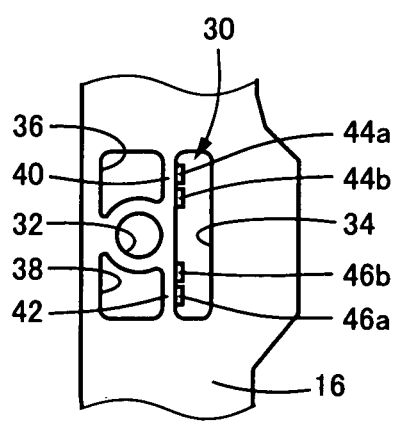
FIGS. 3A and 3B are front views each showing an enlarged portion near an opening provided in an operating pedal to form elastic portions, FIG. 3A being the view exaggeratingly showing an initial state before a depressing operation is performed, and FIG. 3B being the view exaggeratingly showing a state when the depressing operation is performed.
Figure 3B:
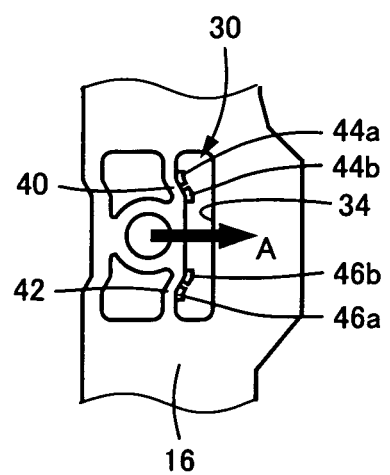

A load sensor 30 is integrally incorporated in the operating pedal 16. The load sensor 30 electrically detects the reaction force applied from the clevis pin 26. That is, as evident from FIG. 2 in which the pedal support 12 and the operating rod 22 are omitted, three openings (through-holes) 34, 36, and 38 are provided near a connecting hole 32 through which the clevis pin 26 is inserted. Thus, the clevis pin 26 is permitted to be relatively displaced toward a driver's seat, that is, in a reaction force direction shown by an arrow A in FIG. 3B, by the reaction force. FIGS. 3A and 3B are front views each showing an enlarged portion in which the openings 34, 36, and 38 are provided, in the operating pedal 16. FIG. 3A shows an initial state before a depressing operation is performed, and FIG. 3B shows a state when the depressing operation is performed, that is, a state in which the portion near the connecting hole 32 is elastically deformed in the reaction force direction A by the reaction force.

The opening 34 is provided on a side toward which the clevis pin 26 is displaced, that is, a side toward which the reaction force is applied in the reaction force direction A. A predetermined thickness is left between the opening 34 and the connecting hole 32. The opening 34 has a rectangular shape or an elliptical shape that is long in a top-bottom direction. The openings 36 and 38 are provided above and below the connecting hole 32, that is, the openings 36 and 38 are provided on both sides of a plane extending through the clevis pin 26 and extending in the reaction force direction A, in a manner such that a thin plate portion 40 is provided between the opening 36 and the opening 34, and a thin plate portion 42 is provided between the opening 38 and the opening 34. Thus, the openings 36 and 38 are symmetrically provided above and below the connecting hole 32 in a manner such that the openings 36 and 38 are adjacent to the opening 34. The paired plate portions 40 and 42 are provided to extend in a direction that crosses the reaction force direction A at a substantially right angle. When the reaction force is applied from the clevis pin 26 to the connecting hole 32, the paired plate portions 40 and 42 are elastically bent and deformed as shown in FIG. 3B. The operating pedal 16 is configured using a metal material that permits the clevis pin 26 to be displaced by a predetermined displacement amount due to the elastic deformation of the plate portions 40 and 42. The amount of deformation of the plate portions 40 and 42 is extremely small, and therefore, the amount of deformation of the plate portions 40 and 42 hardly influences the depressing stroke of the operating pedal 16. However, in the drawing, the deformation is exaggeratingly shown in order to facilitate understanding. The reaction force direction A corresponds to the displacement direction of the clevis pin 26.

The load sensor 30 electrically detects the reaction force, that is, the operating force, based on the amount of bending deformation of the plate portions 40 and 42. Paired strain resistance elements 44a and 44b are attached to a plate surface of the plate portion 40, which defines the opening 34. Paired strain resistance elements 46a and 46b are attached to a plate surface of the plate portion 42, which defines the opening 34. That is, the plate portions 40 and 42 are curved due to the displacement of the clevis pin 26, and the plate portions 40 and 42 are partially subjected to compression deformation and tensile deformation. Thus, the portions, which are subjected to compression deformation and tensile deformation, are used as elastic portions, and the paired strain resistance elements 44a and 44b, and the paired strain resistance elements 46a and 46b are substantially symmetrically provided in the elastic portions. The reaction force direction A changes according to the relative pivot of the connecting portion 20 due to the depressing operation performed on the operating pedal 16. However, the paired strain resistance elements 44a and 44b are provided in the portion positioned on one side of the plane extending through the clevis pin 26 and extending in the reaction force direction A, and the paired strain resistance elements 46*a* and 46*b* are provided in the portion positioned on the other side of the plane extending through the clevis pin 26 and extending in the reaction force direction A, in the entire range of the stroke of the depressing operation, regardless of the change in the reaction force direction A. As each of the strain resistance elements 44*a*, 44*b*, 46*a*, and 46*b*, for example, a thin film semiconductor strain gauge, a thick film semiconductor strain gauge, or an ordinary strain gauge is preferably used. The four strain resistance elements 44*a*, 44*b*, 46*a*, and 46*b* are provided on the plate surfaces of the plate portions 40 and 42 at a center portion in a plate thickness direction of the operating pedal 16 (i.e., the top-bottom direction in FIG. 1B, and a direction extending from one surface of paper on which FIGS. 3A and 3B are shown to the reverse surface of the paper). An insulating film made of glass paste or the like is provided in advance on the plate surfaces of the plate portions 40 and 42. The strain resistance elements 44*a*, 44*b*, 46*a*, and 46*b* are integrally provided on the insulating film by calcination or the like.

Figure 4A:
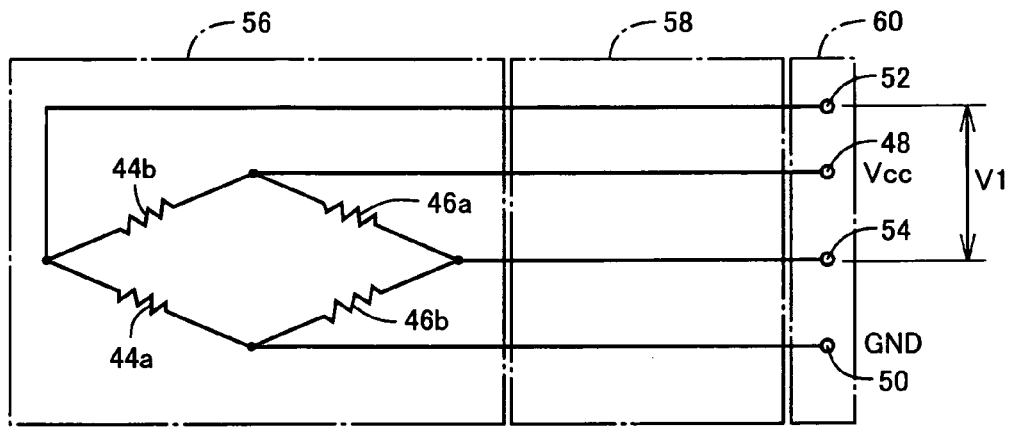
FIGS. 4A and 4B show an example of a detecting circuit formed to include strain resistance elements shown in FIGS. 3A to 3B, FIG. 4A showing a bridge circuit for detecting a load, and FIG. 4B showing a bridge circuit provided in addition to the circuit shown in FIG. 4A in order to detect a depressing stroke.

The four strain resistance elements 44*a*, 44*b*, 46*a*, and 46*b* are connected to each other to form a bridge circuit shown in FIG. 4A. The four strain resistance elements 44*a*, 44*b*, 46*a*, and 46*b* are connected to a control circuit portion of the vehicle through a wire harness 58 and a connector 60. When a predetermined voltage is applied between power source terminals 48 and 50, an electric signal (a load detection signal) V1 corresponding to the reaction force is output from between paired output terminals 52 and 54. In the electric circuit, a portion constituting the bridge circuit is configured using a printed board and the like, and is housed in a circuit box 56. The circuit box 56 is integrally fixed, for example, to the side surface of the operating pedal 16. Also, the connector 60 is connected to the control circuit portion or the like of the vehicle. The reaction force, that is, the operating force is calculated based on the load detection signal V1 output from between the output terminals 52 and 54, using a predetermined operational equation, a map, or the like. A power source that applies a voltage between the power source terminals 48 and 50 may be disposed in the circuit box 56. Also, the bridge circuit, in which the four strain resistance elements 44*a*, 44*b*, 46*a*, and 46*b* are connected to each other, may be formed directly on, for example, the inner wall surface of the opening 34, on which the strain resistance elements 44*a*, 44*b*, 46*a*, and 46*b* are provided, and the circuit box 56 may be omitted. In contrast, for example, a calculation portion that calculates the operating force, the depressing stroke, and the like, and an amplifier may be disposed on a circuit board in the circuit box 56.

Figure 4B:
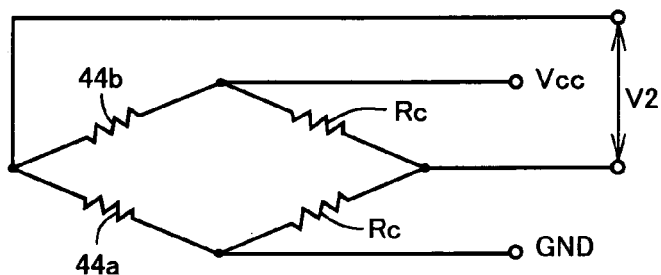

With the load detecting circuit shown in FIG. 4A, it is possible to detect the load, that is, the operating force with high accuracy, regardless of the change in the displacement direction of the clevis pin 26 (i.e., the reaction force direction A) due to the depressing operation performed on the operating pedal 16. When a bridge circuit is formed using the strain resistance elements 44*a* and 44*b* and paired fixed resistors Rc as shown in FIG. 4B, an electric signal V2 is changed due to the change in the displacement direction of the clevis pin 26 (i.e., the reaction force direction A) due to the depressing operation performed on the operating pedal 16. Accordingly, it is possible to detect the depressing stroke of the operating pedal 16 based on the values of the electric signals V1 and V2. The fixed resistors Rc may be provided in the circuit box 56, or may be provided in the control circuit portion of the vehicle.

In the operating pedal device 10 for a vehicle, the operating pedal 16 is relatively pivotably connected to the operating rod 22 through the clevis pin 26. In the operating pedal 16, the three openings 34, 36, and 38 are provided near the clevis pin 26 to permit the clevis pin 26 to be displaced by the reaction force. In the operating pedal 16, the plate portions 40 and 42, which are elastically deformed due to the displacement of the clevis pin 26, are used as the elastic portions, and the strain resistance elements 44*a*, 44*b*, 46*a*, and 46*b* are attached to the elastic portions. Thus, the load sensor 30 is configured integrally with the operating pedal 16. Therefore, as compared to the case where a load sensor, which is a separate body and includes a separate elastic body, is integrally fitted as in a conventional case, the number of components in the entire device is reduced, the structure is made simple, and the device is configured at low cost.

Also, in the embodiment, the elastic portions, to which the strain resistance elements 44*a*, 44*b*, 46*a*, and 46*b* are attached, are located in the portions positioned on both sides of the plane extending through the clevis pin 26 and extending in the displacement direction of the clevis pin 26 (i.e., the reaction force direction A), in the entire range of the stroke of the depressing operation performed on the operating pedal 16, regardless of the change in the displacement direction of the clevis pin 26 (i.e., the reaction force direction A) due to the depressing operation performed on the operating pedal 16. Therefore, strain in the strain resistance elements 44*a*, 44*b*, 46*a*, and 46*b* provided in the elastic portions on the both sides is relatively increased and decreased due to the depressing operation performed on the operating pedal 16. Thus, it is possible to detect the operating force with high accuracy, regardless of the change in the displacement direction. That is, it is possible to obtain substantially constant detection performance, regardless of the change in the displacement direction of the clevis pin 26. Thus, it is possible to detect the operating force with high accuracy, without the need of performing a correction process or the like.

Also, in the embodiment, the elastic portions are formed by providing the openings 34, 36, and 38 in the operating pedal 16 connected to the operating rod 22, which is the reaction force member, through the clevis pin 26. The load sensor 30 is configured integrally with the operating pedal 16. The output transmitted to the operating rod 22 is detected as the operating force. Therefore, it is possible to detect, with high accuracy, the braking force generated according to the output of the operating rod 22.

Also, the clevis pin 26 is inserted through the connecting hole 32 of the operating pedal 16, and the both end portions of the clevis pin 26 are held by the clevis 24. Therefore, it is possible to suppress generation of a torsional moment in the operating pedal 16, and to detect the operating force with high accuracy. In addition, for example, even when the operating pedal 16 is relatively displaced in an axial direction of the clevis pin 26 (i.e., the top-bottom direction in FIG. 1B), the good detection accuracy of the load sensor 30 is maintained, and the operating force is transmitted to the operating rod 22 without loss.

Also, in the embodiment, the elastic portions are formed by providing the openings 34, 36, and 38 near the connecting hole 32 of the operating pedal 16, and the load sensor 30 is configured integrally with the operating pedal 16 by attaching the strain resistance elements 44*a*, 44*b*, 46*a*, and 46*b* to the elastic portions. Therefore, it is possible to incorporate the load sensor 30 in the operating pedal 16 without the need of greatly changing the design. Thus, it is possible to electrically detect the operating force easily.

Figure 5:
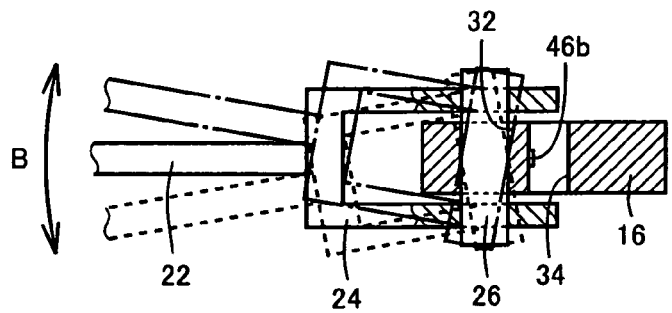
FIG. 5 is a sectional view that corresponds to FIG. 1B, and that is used to explain the inclination of a rod caused by, for example, play in each portion.
Figure 6A:
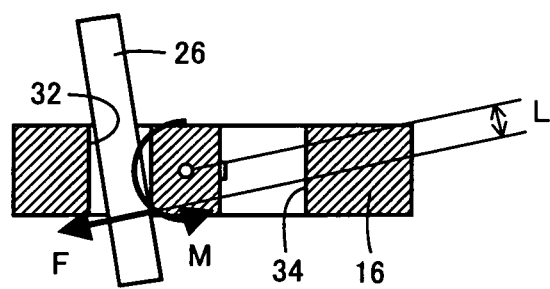
FIGS. 6A and 6B are views used to explain a torsional moment M generated when a rod is inclined as shown in FIG. 5 and a reaction force in an oblique direction is applied to the operating pedal, and an arm length L, in the embodiment shown in FIG. 1.
Figure 6B:
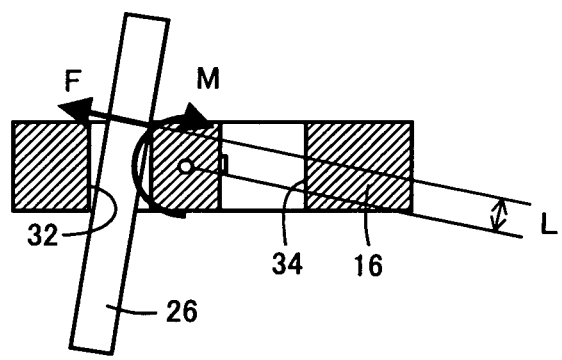
Figure 7A:
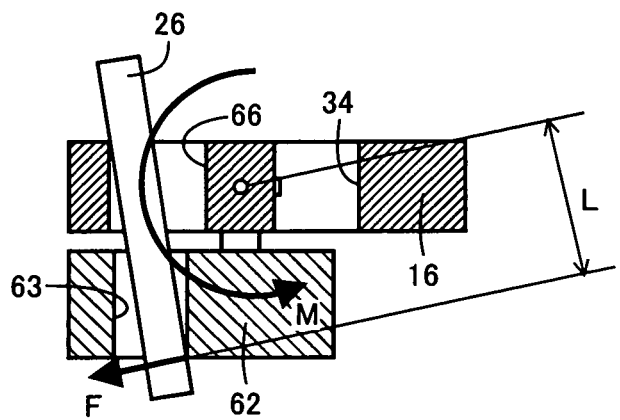
FIGS. 7A and 7B are views used to explain the torsional moment M generated when the rod is inclined as shown in FIG. 5 and the reaction force in the oblique direction is applied, and the arm length L, in the case where a connecting pin is connected to a load transmission member integrally fixed to one side of the operating pedal.
Figure 7B:
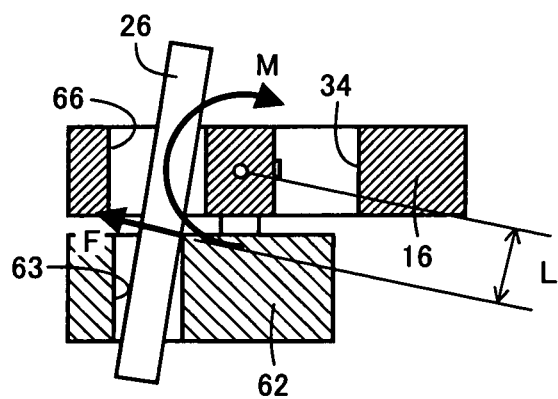
Figure 8A:
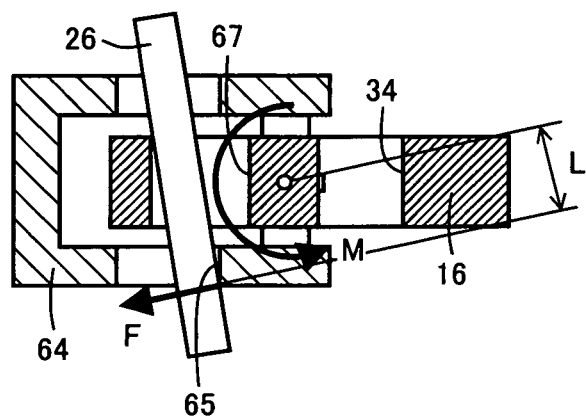
FIGS. 8A and 8B are views used to explain the torsional moment M generated when the rod is inclined as shown in FIG. 5 and the reaction force in the oblique direction is applied, and the arm length L, in the case where the connecting pin is connected to a load transmission member with an angular U-shape section, which is integrally fixed to the operating pedal.
Figure 8B:
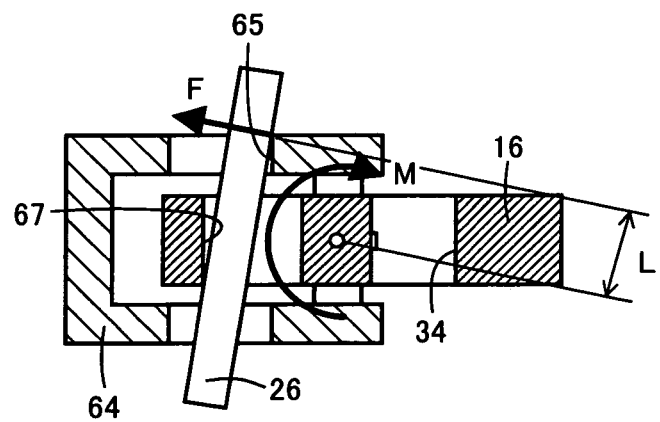

Also, in the embodiment, the clevis pin 26 directly contacts the operating pedal 16 to deform the plate portions 40 and 42. Therefore, a torsional moment M generated in the operating pedal 16 is reduced, and thus, the operating force is detected with high accuracy, for example, as compared to the case where a connecting hole 63 is provided in a load transmission member 62 integrally provided to extend from the operating pedal 16 toward an end portion side in the axial direction of the clevis pin 26 and the clevis pin 26 is connected to the load transmission member 62 as shown in FIGS. 7A and 7B, and the case where a connecting hole 65 is provided in a load transmission member 64 integrally provided to extend from the operating pedal 16 toward end portion sides in the axial direction of the clevis pin 26 and the clevis pin 26 is connected to the load transmission member 64 as shown in FIGS. 8A and 8B. That is, the operating rod 22 is rockable relative to the operating pedal 16 as shown by an arrow B in FIG. 5 due to, for example, play in each portion. Thus, there is a possibility that the operating rod 22 is inclined in a vehicle width direction with respect to the operating pedal 16, as shown by chain lines and dashed lines. Each of FIGS. 6A and 6B to FIGS. 8A and 8B shows an operating force F applied to the operating rod 22 when the operating rod 22 is inclined in the vehicle width direction, the torsional moment M generated due to the reaction force applied in a direction opposite to a direction in which the operating force F is applied, and an arm length L of the torsional moment M. FIGS. 6A and 6B show the case where the clevis pin 26 directly contacts the operating pedal 16 according to the embodiment. In the embodiment shown in FIGS. 6A and 6B, the arm length L and the torsional moment M are smallest. FIGS. 7A and 7B show the case where the load transmission member 62 is fixed to the left side surface of the operating pedal 16. In the case where the clevis pin 26 is inclined so that an upper end of the clevis pin 26 is moved toward the left side in FIG. 7A, the arm length L and the torsional moment M are largest. In the case where the clevis pin 26 is inclined so that the upper end of the clevis pin 26 is moved toward the right side in FIG. 7B, the arm length L and the torsional moment M are larger than those in the embodiment shown in FIGS. 6A and 6B. FIGS. 8A and 8B show the case where the load transmission member 64 with an angular U-shape section is fixed to the operating pedal 16 to extend from one side surface of the operating pedal 16 to the other side surface of the operating pedal 16. In the cases shown in FIGS. 8A and 8B, the arm length L and the torsional moment M are larger than those in the embodiment shown in FIGS. 6A and 6B. When the torsional moment M becomes large as described above, torsion occurs in the plate portions 40 and 42. Therefore, the manner of deformation of each of the strain resistance elements 44a, 44b, 46a, and 46b attached to the plate portions 40 and 42 is changed, and the resistance value of each of the strain resistance elements 44a, 44b, 46a, and 46b is changed. Therefore, the detection accuracy of the load sensor 30 may be deteriorated. Thus, in the embodiment shown in FIGS. 7A and 7B, an insertion hole 66 is provided in the operating pedal 16 instead of providing the connecting hole 32, and the clevis pin 26 is inserted through the insertion hole 66 with play, and in the embodiment shown in FIGS. 8A and 8B, an insertion hole 67 is provided in the operating pedal 16 instead of providing the connecting hole 32, and the clevis pin 26 is inserted through the insertion hole 67 with play. The embodiment of the first invention includes the case where the clevis pin 26 is connected to the operating pedal 16 through the load transmission member 62 as shown in FIGS. 7A and 7B, and the case in which the clevis pin 26 is connected to the operating pedal 16 through the load transmission member 64 as shown in FIGS. 8A and 8B. The inclination angle is shown to be extremely large in each of FIG. 5 to FIGS. 8A and 8B, and the play in each of the connecting holes 32, 63, and 65 is shown to be extremely large in each of FIGS. 6A and 6B to FIGS. 8A and 8B, in order to clearly show the inclination angle and the play in each drawing. However, the inclination angle and the play are actually not so large as shown in each drawing. In the configurations shown in FIGS. 7A and 7B and FIGS. 8A and 8B, the clevis pin 26 does not directly contact the operating pedal 16 even when the operating rod 22 is inclined. Also, the operating force F is substantially the same in every case.

Next, another embodiment of the invention will be described. In the embodiment described below, the portions that are substantially the same as those in the above-described embodiment are denoted by the same reference numerals, and the detailed description thereof will be omitted.

Figure 9A:
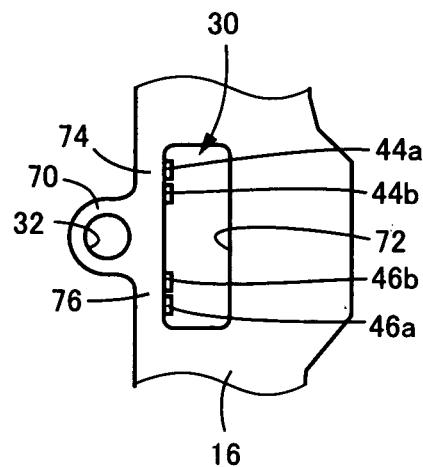
FIGS. 9A and 9B are views showing another embodiment of the invention, FIGS. 9A and 9B corresponding to FIGS. 3A and 3B.
Figure 9B:
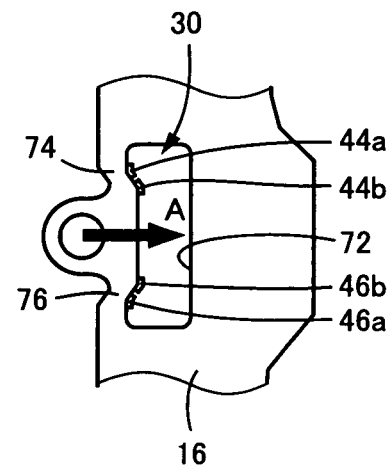

FIGS. 9A and 9B are front views each showing a portion near the connecting hole 32 in the operating pedal 16, FIGS. 9A and 9B corresponding to FIGS. 3A and 3B. FIG. 9A shows the initial state before the depressing operation is performed, and FIG. 9B shows the state when the depressing operation is performed. In the operating pedal 16, the connecting hole 32 is provided in a protruding portion 70 provided to protrude forward, and the clevis pin 26 is inserted through the connecting hole 32. In addition, a single opening (through-hole) 72 is provided in the operating pedal 16 to extend along a front end edge of the operating pedal 16. The opening 72 has a rectangular shape or an elliptical shape that is long in the top-bottom direction. The opening 72 is provided to extend from a position above the protruding portion 70 to a position below the protruding portion 70 in a manner such that an upper portion of the opening 72, which is located above the protruding portion 70, is symmetrical to a lower portion of the opening 72, which is located below the protruding portion 70. Thus, paired plate portions 74 and 76, which function as the elastic portions, are symmetrically provided in the front end edge of the operating pedal 16 at positions on both sides of the protruding portion 70. The load sensor 30 is configured integrally with the operating pedal 16 by attaching the strain resistance elements 44a and 44b to the plate surface of the plate portion 74, which defines the opening 72, and attaching the strain resistance elements 46a and 46b to the plate surface of the plate portion 76, which defines the opening 72. In the embodiment as well, it is possible to obtain the same advantageous effects as the advantageous effects obtained in the above-described embodiment. For example, as compared to the case where a load sensor, which is a separate body and includes a separate elastic body, is integrally fitted as in a conventional case, the number of components in the entire device is reduced, the structure is made simple, and the device is configured at low cost.

In the above-described embodiment, paired plate portions provided ahead of the openings 36 and 38, respectively, in the vehicle (i.e., the front end edge of the operating pedal 16) are bent and deformed due to the displacement of the clevis pin 26 in the same manner as the manner in which the plate portions 40 and 42 are bent and deformed, as shown in FIG. 3B. Therefore, the plate portions ahead of the openings 36 and 38 in the vehicle may be used as the elastic portions, and the strain resistance elements 44a, 44b, 46a, and 46b may be attached to the elastic portions, as in the embodiment shown in FIGS. 9A and 9B.

Figure 10A:
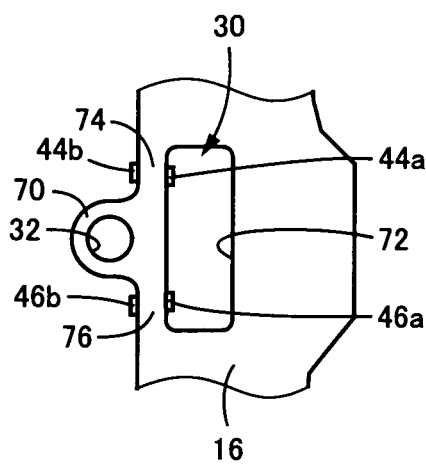
FIGS. 10A and 10B are views showing a yet another embodiment of the invention, FIGS. 10A and 10B corresponding to FIGS. 3A and 3B.
Figure 10B:
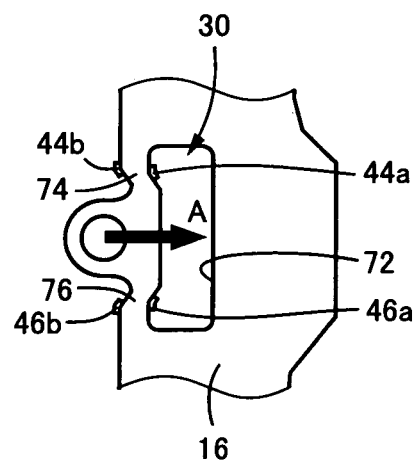

FIGS. 10A and 10B show the case where some of the strain resistance elements 44a, 44b, 46a, and 46b are attached to opposite plate surfaces of the plate portions 74 and 76, that is, a front end surface of the operating pedal 16 in the embodiment shown in FIGS. 9A and 9B. It is possible to attach all of the strain resistance elements 44a, 44b, 46a, and 46b to the front end surface of the operating pedal 16. In the embodiment shown in FIGS. 3A and 3B as well, all of, or some of the strain resistance elements 44a, 44b, 46a, and 46b may be attached to opposite plate surfaces of the plate portions 40 and 42, that is, the plate surfaces defining the openings 36 and 38.

Figure 11:
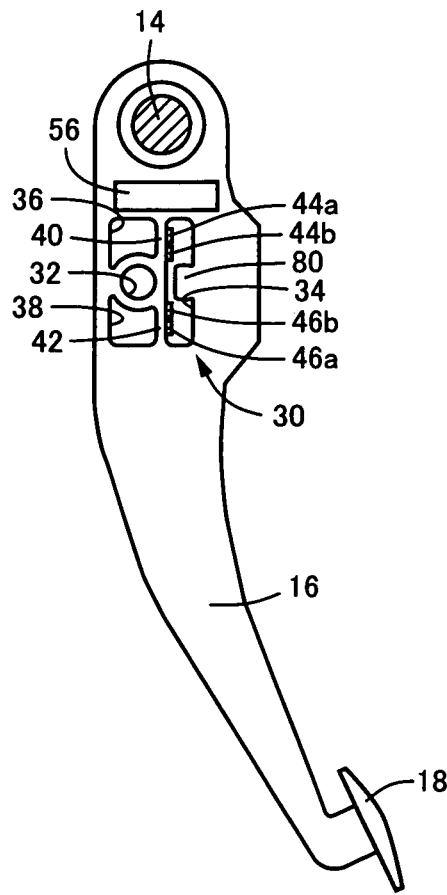
FIG. 11 is a view showing the case where a stopper is provided in the embodiment shown in FIGS. 1A and 1B, FIG. 11 being a front view corresponding to FIG. 2.
Figure 12A:
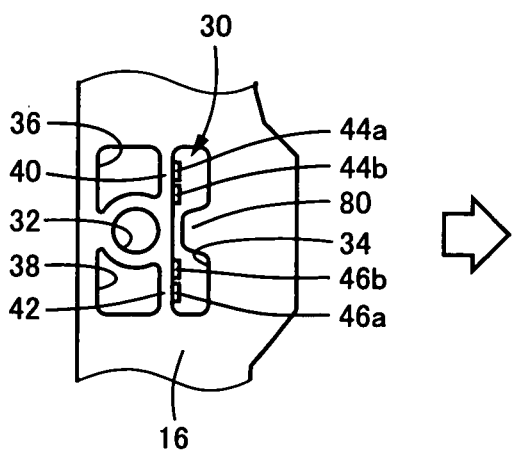
FIGS. 12A and 12B are front views each showing an enlarged portion near the stopper in the embodiment shown in FIG. 11, FIG. 12A being the view exaggeratingly showing the initial state before the depressing operation is performed, and FIG. 12B being the view exaggeratingly showing the state when an excessive depressing operation is performed.
Figure 12B:
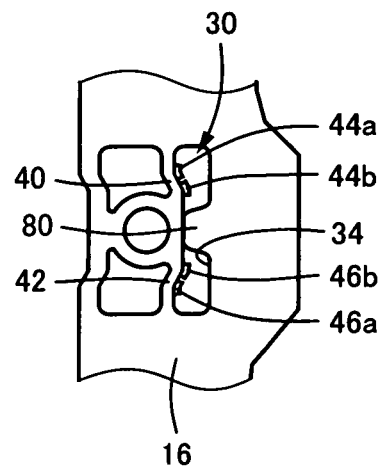

FIG. 11 shows the case where a stopper 80 is integrally provided on a rear side wall surface of the opening 34 in the embodiment shown in FIGS. 1A and 1B. When a depressing force larger than the largest value in a normal use range is applied to the operating pedal 16, the stopper 80 contacts a front side wall surface of the opening 34, and thus, the clevis pin 26 is prevented from being further displaced, and the plate portions 40 and 42 are prevented from being further deformed. FIGS. 12A and 12B are front views each showing an enlarged portion near the opening 34. FIG. 12A shows the initial state before the depressing operation is performed, and FIG. 12B shows the state when an excessive depressing operation is performed, so that the stopper 80 contacts the front side wall surface. Thus, when the depressing force larger than the largest value in the normal use range is applied in this manner, and the stopper 80 contacts the front side wall surface of the opening 34 to prevent the clevis pin 26 from being further displaced, excessive deformation of the plate portions 40 and 42 is prevented to ensure durability, while the operating force in the normal use range is permitted to be detected based on the deformation of the plate portions 40 and 42. The portion in which the stopper 80 is provided corresponds to the small-width portion at which a front-rear width of the opening 34 is reduced to 0 to prevent the clevis pin 26 from being further displaced when the depressing force larger than the largest value in the normal use range is applied. The stopper 80 may be provided on the front side wall surface of the opening 34, and the stopper 80 may contact the rear side wall surface.

Figure 13A:
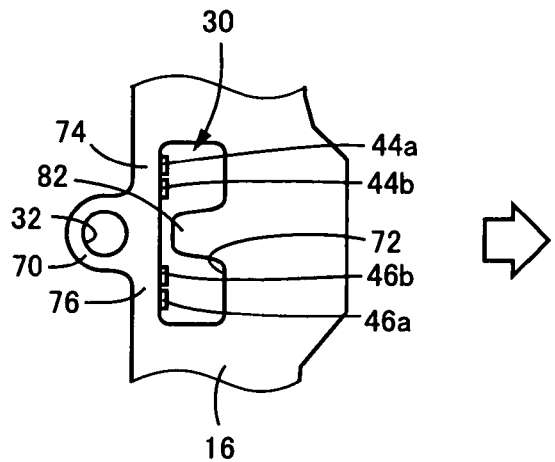
FIGS. 13A and 13B are views used to explain the case where the stopper is provided in the embodiment shown in FIGS. 9A and 9B, FIGS. 13A and 13B being front views corresponding to FIGS. 12A and 12B.
Figure 13B:
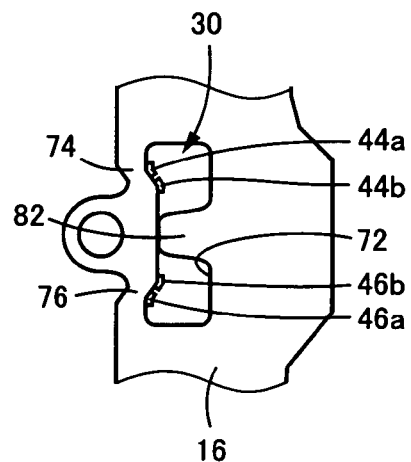

FIGS. 13A and 13B show the case where a stopper 82, which has the same function as the function of the stopper 80, is integrally provided in the opening 72 in the embodiment shown in FIGS. 9A and 9B. FIG. 13A shows the initial state before the depressing operation is performed, and FIG. 13B shows the state when an excessive depressing operation is performed, so that the stopper 82 contacts the front side wall surface of the opening 72. The portion in which the stopper 82 is provided also corresponds to the small-width portion.

Figure 14:
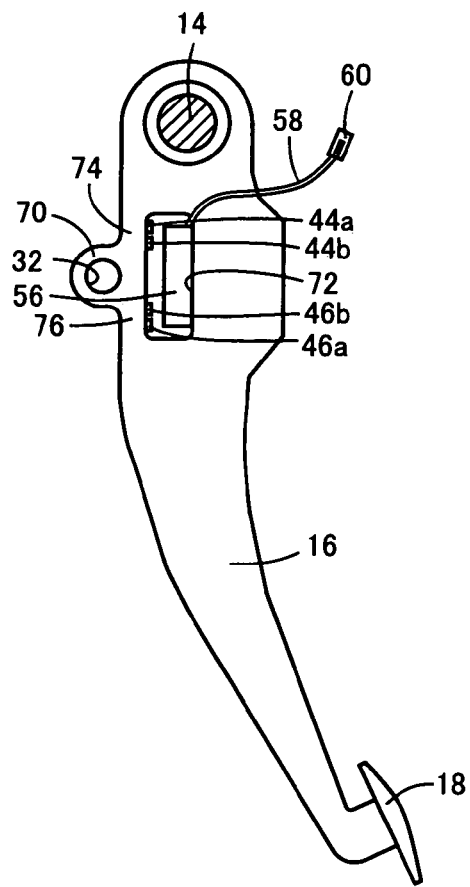
FIG. 14 is a view showing the case where a circuit box is disposed in the opening in the embodiment shown in FIGS. 9A and 9B, FIG. 14 being a front view corresponding to FIG. 2.

FIG. 14 shows the case where the circuit box 56 is integrally fixed, using fixing means such as a screw, in the opening 72 provided to permit the clevis pin 26 from being displaced by the reaction force in the embodiment shown in FIGS. 9A and 9B. As compared to the case where the circuit box 56 is fixed to the side surface of the operating pedal 16 as in the embodiment shown in FIGS. 1A and 1B, the circuit box 56 does not cause interference, for example, when the operating pedal 16 is attached to the pedal support 12, and when the depressing operation is performed on the operating pedal 16. Thus, the embodiment can be applied to a conventional operating pedal device for a vehicle without greatly changing the design. The opening 72 is provided to have a width large enough to permit the clevis pin 26 to be displaced by the reaction force, regardless of existence of the circuit box 56.

FIGS. 15A to 15C show three examples in which a load input position varies in the plate thickness direction of the plate portions 40 and 42 that function as the elastic portions in the embodiment shown in FIGS. 1A and 1B (i.e., a right-left direction in FIGS. 15A and 15B), that is, the position of the clevis pin 26 (i.e., the position of the connecting hole 32) varies. FIG. 15A shows the case where the plate surfaces of the plate portions 40 and 42, which are opposite to the plate surfaces defining the opening 34, substantially coincide with the load input portion (i.e., a rear end of the clevis pin 26). FIG. 15B shows the case where a center of the plate thickness of the plate portions 40 and 42 substantially coincides with the load input position (i.e., the rear end of the clevis pin 26). FIG. 15C shows the case where the plate surfaces of the plate portions 40 and 42, which define the opening 34, substantially coincide with the load input position (i.e., the rear end of the clevis pin 26). In FIGS. 15A to 15C, lower figures are front views each showing the operating pedal 16 seen from the left side of the vehicle. An upper figure in FIG. 15A shows a section taken along a line XVA-XVA in the front view in FIG. 15A together with the clevis 24. An upper figure in FIG. 15B shows a section taken along a line XVB-XVB in the front view in FIG. 15B together with the clevis 24. An upper figure in FIG. 15C shows a section taken along a line XVC-XVC in the front view in FIG. 15C, together with the clevis 24. In the embodiment shown in FIGS. 1A and 1B, the plate surfaces of the plate portions 40 and 42, which are opposite to the plate surfaces defining the opening 34, substantially coincide with the load input position (i.e., the rear end of the clevis pin 26), as in the example shown in FIG. 15A. However, the embodiment of the invention includes the example shown in FIG. 15B and the example shown in FIG. 15C.

Figure 16:
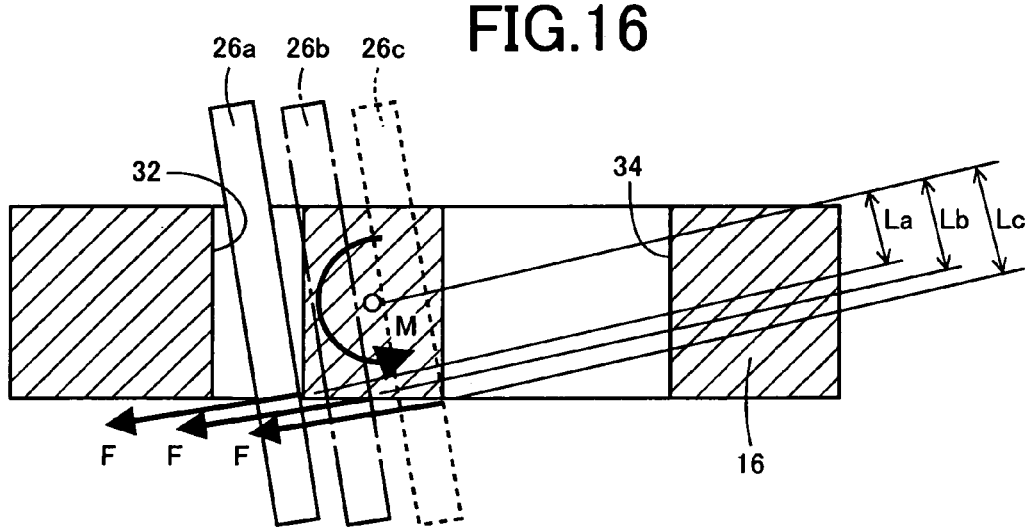
FIG. 16 is a view showing torsional moment arm lengths La to Lc comparatively in the three examples shown in FIGS. 15A to 15C.

FIG. 16 shows the arm length L of the torsional moment M generated by the reaction force applied in the direction opposite to the direction in which the operating force F is applied, when the operating rod 22 is inclined and the operating force F is applied in an oblique direction as shown in FIG. 6A, in each of the three examples shown in FIGS. 15A to 15C. The positions of clevis pins 26a, 26b, and 26c in FIG. 16 correspond to FIG. 15A, FIG. 15B, and FIG. 15C, respectively. Arm lengths La, Lb, and Lc correspond to FIG. 15A, FIG. 15B, and FIG. 15C, respectively. The arm length La in the case shown in FIG. 15A is smallest. The arm length Lc in the case shown in FIG. 15C is largest. The operating force F is the same and the reaction force is the same in FIG. 15A to FIG. 15C. Therefore, the torsional moment M in FIG. 15A is smallest, and the torsional moment M in FIG. 15C is largest, as the arm length La in FIG. 15A is smallest, and the arm length Lc in FIG. 15C is largest. Thus, in the case shown in FIG. 15A, the most excellent detection accuracy is obtained. The detection accuracy in the case shown in FIG. 15B is lower than the detection accuracy in the case shown in FIG. 15A, and the detection accuracy in the case shown in FIG. 15C is lower than the detection accuracy in the case shown in FIG. 15B.

Figure 17:
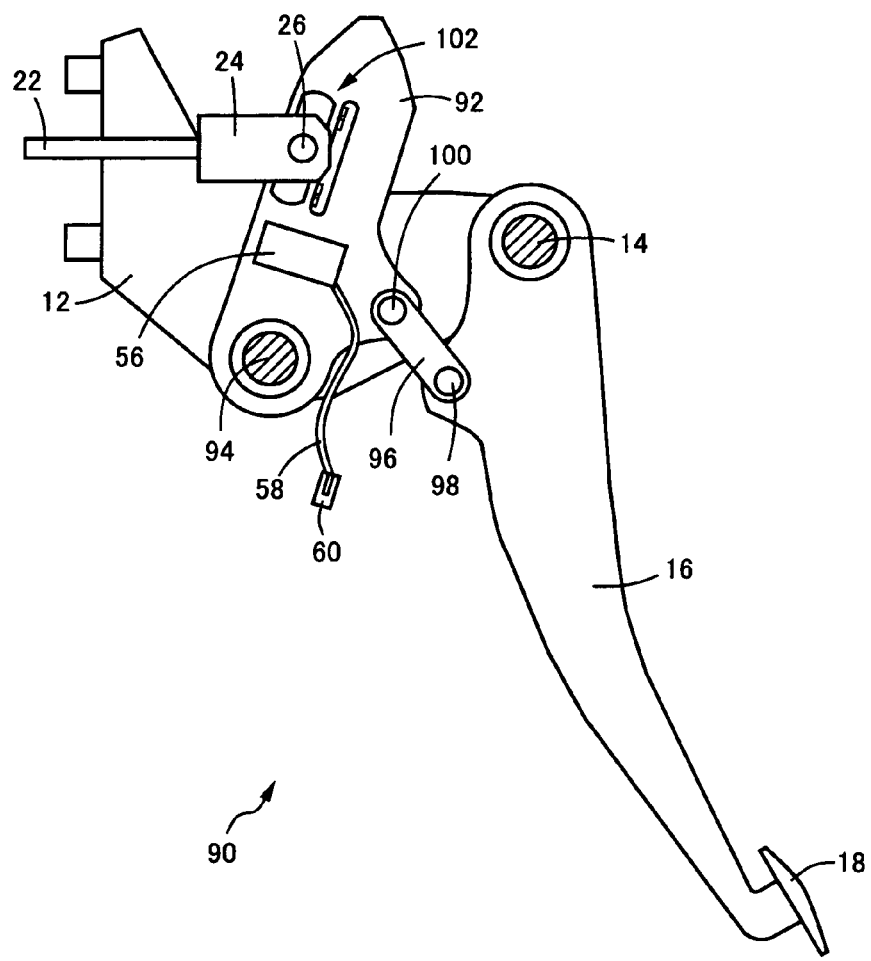
FIG. 17 is a view used to explain the case where the invention is applied to an operating pedal device for a vehicle, which includes an intermediate lever, FIG. 17 being a front view corresponding to FIG. 1A.

An operating pedal device 90 for a vehicle shown in FIG. 17 includes an intermediate lever 92. The operating force is transmitted from the operating pedal 16 to the operating rod 22 through the intermediate lever 92. The intermediate lever 92 is pivotably disposed at the pedal support 12 using a support pin 94 extending in parallel to the support shaft 14. In addition, the intermediate lever 92 is connected to the operating pedal 16 through a connecting link 96, and the intermediate lever 92 is mechanically pivoted about the support pin 94 in accordance with the depressing operation performed on the operating pedal 16. Both end portions of the connecting link 96 are relatively pivotably connected to the operating pedal 16 and the intermediately lever 92 through connecting pins 98 and 100, respectively. The connecting pins 98 and 100 are parallel to the support shaft 14.

An end portion of the intermediate lever 92 is connected to the operating rod 22 through a connecting portion 102. The connecting portion 102 has the same configuration as the configuration of the connecting portion 20. In the intermediate lever 92 that is the pedal-side member, the paired plate portions 40 and 42, which function as the elastic portions, are formed by providing the openings 34, 36, and 38 in addition to the connecting hole 32 as shown in FIG. 18. The load sensor 30 is configured integrally with the intermediate lever 92 by attaching the strain resistance elements 44a and 44b to the plate portion 40, and attaching the strain resistance elements 46a and 46b to the plate portion 42. Also, in the embodiment, the circuit box 56 is integrally fixed to a side surface of the intermediate lever 92.

Thus, in this embodiment as well, the paired plate portions 40 and 42, which function as the elastic portions, are integrally provided in the intermediate lever 92, and the load sensor 30 is configured integrally with the intermediate lever 92 by attaching the strain resistance elements 44a and 44b to the plate portion 40, and attaching the strain resistance elements 46a and 46b to the plate portion 42. Therefore, in this embodiment as well, it is possible to obtain the same advantageous effects as the advantageous effects obtained in the embodiment shown in FIGS. 1A and 1B. For example, as compared to the case where a load sensor, which is a separate body and includes a separate elastic body, is integrally fitted to the intermediate lever 92 as in a conventional case, the number of components in the entire device is reduced, the structure is made simple, and the device is configured at low cost.

It is possible to apply the invention to a connecting portion in which the connecting link 96 is relatively pivotably connected to the operating pedal 16 and the intermediate lever 92 through the connecting pins 98 and 100, respectively, and a connecting portion in which the intermediate lever 92 is pivotably attached to the pedal support 12 through the support pin 94. That is, in a connecting portion connecting the operating pedal 16 and the connecting link 96, a connecting portion connecting the connecting link 96 and the intermediate lever 92, or a connecting portion connecting the intermediate lever 92 and the pedal support 12, the plate portions 40 and 42, which function as the elastic portions, may be integrally formed by providing, for example, the openings 34, 36, and 38 in one of the paired members in the connecting portion, as in the connecting portion 20, and the load sensor 30 may be configured integrally with the one of the paired members by attaching the strain resistance elements 44a and 44b to the plate portion 40 and attaching the strain resistance elements 46a and 46b to the plate portion 42.

FIG. 19 is a view showing another example of the operating pedal device for a vehicle, which includes the intermediate lever 92. In the intermediate lever 92, the connecting hole 32 is provided in the protruding portion 70 provided to protrude forward as shown in FIGS. 9A and 9B, and the clevis pin 26 is inserted through the connecting hole 32. In addition, the single opening (through-hole) 72 is provided in the intermediate lever 92 to extend along a longitudinal direction of the intermediate lever 92. The opening 72 has a rectangular shape or an elliptical shape that is long in the top-bottom direction. The opening 72 is provided to extend from one side of the protruding portion 70 to the other side of the protruding portion 70 in a manner such that a portion of the opening 72, which is located on one side of the protruding portion 70, is symmetrical to a portion of the opening 72, which is located on the other side of the protruding portion 70. Thus, the paired plate portions 74 and 76, which function as the elastic portions, are symmetrically provided in the front end edge of the intermediate lever 92 at positions on both sides of the protruding portion 70. The load sensor 30 is configured integrally with the intermediate lever 92 by attaching the strain resistance elements 44a and 44b to the plate surface of the plate portion 74, which defines the opening 72, and attaching the strain resistance elements 46a and 46b to the plate surface of the plate portion 76, which defines the opening 72. In this embodiment, the circuit box 56 is integrally fixed, using fixing means such as a screw, inside the opening 72 provided to permit the clevis pin 26 from being displaced by the reaction force, as in FIG. 14. Therefore, as compared to the case where the circuit box 56 is fixed to the side surface of the intermediate lever 92 as in the embodiment shown in FIG. 17, the circuit box 56 does not cause interference, for example, when the intermediate lever 92 is attached to the pedal support 12, and when the depressing operation is performed on the operating pedal 16. Thus, the embodiment can be applied to a conventional operating pedal device for a vehicle without greatly changing the design. The opening 72 is provided to have a width large enough to permit the clevis pin 26 to be displaced by the reaction force, regardless of existence of the circuit box 56. All of, or some of the strain resistance elements 44a, 44b, 46a, and 46b may be attached to opposite plate surfaces of the plate portions 74 and 76, that is, a front end surface of the intermediate lever 92.

Figure 20:
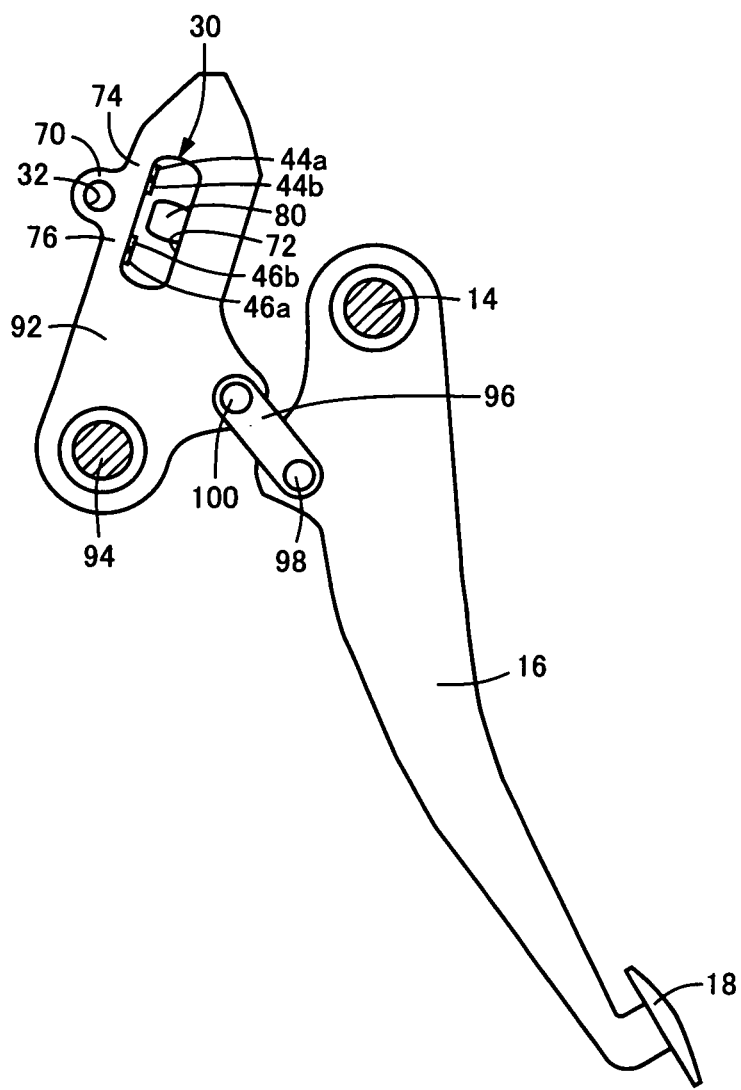
FIG. 20 is a view showing the case where the stopper is provided in the embodiment shown in FIG. 19.

FIG. 20 shows the case where the stopper 80 is integrally provided on the rear side wall surface of the opening 72 as in FIG. 11, in the embodiment shown in FIG. 19. As in the embodiment shown in FIG. 11, excessive deformation of the plate portions 74 and 76 is prevented to ensure durability, while the operating force in the normal use range is permitted to be detected based on the deformation of the plate portions 74 and 76.

FIGS. 21A to 21C show the case where the four strain resistance elements 44a to 44d, and the four strain resistance elements 46a to 46d are provided in the paired plate portions 40 and 42, respectively. FIG. 21A is a front view corresponding to FIG. 3A. FIG. 21B is a sectional view taken along a line XXIB-XXIB in FIG. 21A. FIG. 21C is a circuit diagram showing the bridge circuit that takes out the load detection signal. As shown in the sectional view in FIG. 21B, the eight strain resistance elements 44a to 44d, and 46a to 46d are disposed in two lines symmetrically with respect to a centerline in the plate surfaces of the plate portions 40 and 42, the centerline extending through a center in the vehicle width direction. Thus, for example, even when the torsional moment M is generated as shown in FIGS. 6A and 6B, it is possible to detect the depressing stroke and the operating force with high accuracy, by connecting the strain resistance elements 44a to 44d and 46a to 46d so as to form two sets of bridge circuits as shown in FIG. 21C, and averaging electric signals V3 and V4 of the both bridge circuits.

Although the embodiments of the invention have been described in detail with reference to the drawings, the embodiments are merely examples, and the invention can be implemented in various forms obtained by altering or modifying the embodiments based on the knowledge of those skilled in the art.

What is claimed is:
1. An operating pedal device for a vehicle, comprising:
an operating pedal disposed at a pedal support fixed to a vehicle so as to be pivotable about an axis of a support shaft, and depressed by a driver;
a reaction force member connected to the operating pedal through at least one connecting portion in which the reaction member and a pedal-side member are connected relatively pivotable about a connecting pin, an output in accordance with an operating force of the operating pedal being transmitted to the reaction force member, and a reaction force corresponding to the output being applied to the reaction force member;
an opening formed in the pedal-side member near the connecting pin to permit the connecting pin to be relatively displaced by the reaction force;

an elastic portion directly formed in the pedal-side member, which is elastically deformed due to displacement of the connecting pin; and a strain detecting element attached to the elastic portion deformed by the reaction force, the strain detecting element electrically detecting the operating force by being deformed together with the elastic portion.

2. The operating pedal device for a vehicle according to claim 1, wherein a plurality of the elastic portions are located in a plurality of locations positioned on both sides of a plane extending through the connecting pin and extending in a displacement direction of the connecting pin, in an entire range of a stroke of a depressing operation, regardless of a change in the displacement direction of the connecting pin due to the depressing operation performed on the operating pedal.

3. The operating pedal device for a vehicle according to claim 2, wherein a stopper is provided in the opening; and the stopper contacts an opposite wall surface of the opening to a wall surface of the opening on which the stopper is provided to prevent the connecting pin from being further displaced when a depressing force larger than a largest value in a normal use range is applied to the operating pedal.

4. The operating pedal device for a vehicle according to claim 3, wherein a circuit box, in which a detecting circuit is provided, is disposed inside the opening; and the detecting circuit connected to the strain detecting element outputs an electric signal corresponding to the operating force.

5. The operating pedal device for a vehicle according to claim 3, wherein in a state where the pedal-side member is inserted inside a clevis with a bifurcated shape, which is integrally fixed to the reaction force member, in the connecting portion, a clevis pin is disposed to extend through the clevis and the pedal-side member, the clevis pin connecting the clevis and the pedal-side member in a manner such that the clevis and the pedal-side member are relatively pivotable;

the clevis pin is the connecting pin; and the reaction force member and the pedal-side member are connected relatively pivotably to each other through the connecting pin.

6. The operating pedal device for a vehicle according to claim 2, wherein a circuit box, in which a detecting circuit is provided, is disposed inside the opening; and the detecting circuit connected to the strain detecting element outputs an electric signal corresponding to the operating force.

7. The operating pedal device for a vehicle according to claim 6, wherein in a state where the pedal-side member is inserted inside a clevis with a bifurcated shape, which is integrally fixed to the reaction force member, in the connecting portion, a clevis pin is disposed to extend through the clevis and the pedal-side member, the clevis pin connecting the clevis and the pedal-side member in a manner such that the clevis and the pedal-side member are relatively pivotable;

the clevis pin is the connecting pin; and the reaction force member and the pedal-side member are connected relatively pivotably to each other through the connecting pin.

8. The operating pedal device for a vehicle according to claim 2, wherein in a state where the pedal-side member is inserted inside a clevis with a bifurcated shape, which is integrally fixed to the reaction force member, in the connecting portion, a clevis pin is disposed to extend through the clevis and the pedal-side member, the clevis pin connecting the clevis and the pedal-side member in a manner such that the clevis and the pedal-side member are relatively pivotable;

the clevis pin is the connecting pin; and the reaction force member and the pedal-side member are connected relatively pivotably to each other through the connecting pin.

9. The operating pedal device for a vehicle according to claim 1, wherein a stopper is provided in the opening; and the stopper contacts an opposite wall surface of the opening to a wall surface of the opening on which the stopper is provided to prevent the connecting pin from being further displaced when a depressing force larger than a largest value in a normal use range is applied to the operating pedal.

10. The operating pedal device for a vehicle according to claim 9, wherein a circuit box, in which a detecting circuit is provided, is disposed inside the opening; and the detecting circuit connected to the strain detecting element outputs an electric signal corresponding to the operating force.

11. The operating pedal device for a vehicle according to claim 10, wherein in a state where the pedal-side member is inserted inside a clevis with a bifurcated shape, which is integrally fixed to the reaction force member, in the connecting portion, a clevis pin is disposed to extend through the clevis and the pedal-side member, the clevis pin connecting the clevis and the pedal-side member in a manner such that the clevis and the pedal-side member are relatively pivotable;

the clevis pin is the connecting pin; and the reaction force member and the pedal-side member are connected relatively pivotably to each other through the connecting pin.

12. The operating pedal device for a vehicle according to claim 9, wherein in a state where the pedal-side member is inserted inside a clevis with a bifurcated shape, which is integrally fixed to the reaction force member, in the connecting portion, a clevis pin is disposed to extend through the clevis and the pedal-side member, the clevis pin connecting the clevis and the pedal-side member in a manner such that the clevis and the pedal-side member are relatively pivotable;

the clevis pin is the connecting pin; and the reaction force member and the pedal-side member are connected relatively pivotably to each other through the connecting pin.

13. The operating pedal device for a vehicle according to claim 1, wherein a circuit box, in which a detecting circuit is provided, is disposed inside the opening; and the detecting circuit connected to the strain detecting element outputs an electric signal corresponding to the operating force.

14. The operating pedal device for a vehicle according to claim 13, wherein
in a state where the pedal-side member is inserted inside a clevis with a bifurcated shape, which is integrally fixed to the reaction force member, in the connecting portion, a clevis pin is disposed to extend through the clevis and the pedal-side member, the clevis pin connecting the clevis and the pedal-side member in a manner such that the clevis and the pedal-side member are relatively pivotable;
the clevis pin is the connecting pin; and
the reaction force member and the pedal-side member are connected relatively pivotably to each other through the connecting pin.

15. The operating pedal device for a vehicle according to claim 1, wherein
in a state where the pedal-side member is inserted inside a clevis with a bifurcated shape, which is integrally fixed to the reaction force member, in the connecting portion, a clevis pin is disposed to extend through the clevis and the pedal-side member, the clevis pin connecting the clevis and the pedal-side member in a manner such that the clevis and the pedal-side member are relatively pivotable;
the clevis pin is the connecting pin; and
the reaction force member and the pedal-side member are connected relatively pivotably to each other through the connecting pin.

16. The operating pedal device for a vehicle according to claim 4, wherein
in a state where the pedal-side member is inserted inside a clevis with a bifurcated shape, which is integrally fixed to the reaction force member, in the connecting portion, a clevis pin is disposed to extend through the clevis and the pedal-side member, the clevis pin connecting the clevis and the pedal-side member in a manner such that the clevis and the pedal-side member are relatively pivotable;
the clevis pin is the connecting pin; and
the reaction force member and the pedal-side member are connected relatively pivotably to each other through the connecting pin.

17. The operating pedal device for a vehicle according to claim 15, wherein
the pedal-side member is the operating pedal.

18. The operating pedal device for a vehicle according to claim 15, further comprising
an intermediate lever pivotably disposed at the pedal support, and connected to the operating pedal through a connecting link,
wherein
the pedal-side member is the intermediate lever.

19. The operating pedal device for a vehicle according to claim 15, wherein
the clevis pin directly contacts the pedal-side member to deform the elastic portion.

* * * * *